United States Patent
Krull

[15] 3,687,252
[45] Aug. 29, 1972

[54] CLUTCH AND BRAKE CONSTRUCTION FOR SPINNING AND TWISTING FRAMES

[72] Inventor: Maynard J. Krull, Andover, Mass.
[73] Assignee: Davis and Furber Machine Company, North Andover, Mass.
[22] Filed: July 6, 1970
[21] Appl. No.: 52,657

[52] U.S. Cl. .................. 192/18 B, 192/14, 192/84 A, 192/66, 57/88
[51] Int. Cl. ............................................. F16d 67/06
[58] Field of Search ......... 192/12 D, 18 B, 55, 106.1, 192/89 A, 66 R; 57/88

[56] References Cited

UNITED STATES PATENTS

| | | | |
|---|---|---|---|
| 3,306,412 | 2/1967 | Fisher | 192/18.2 |
| 3,410,380 | 11/1968 | Kooistra | 192/18.2 |
| 3,570,640 | 3/1971 | Martz | 192/84 A |
| 1,450,202 | 4/1923 | Crowley, Jr. | 192/89 A |

*Primary Examiner*—William F. O'Dea
*Assistant Examiner*—Randall Heald
*Attorney*—Chittick, Pfund, Birch, Samuels & Gauthier

[57] ABSTRACT

This invention relates to improved bearing mountings for a spindle and its aligned driving shaft and the clutch and electromagnetically operated brake therebetween.

4 Claims, 2 Drawing Figures

Inventor:
Maynard J. Krull,
by Chittick, Pfund, Birch, Samuels & Gauthier
Attorneys

CLUTCH AND BRAKE CONSTRUCTION FOR SPINNING AND TWISTING FRAMES

SUMMARY OF THE PRIOR ART

In the operation of a spinning frame, it is necessary from time to time to stop an individual spindle so that the full bobbin thereon may be removed and an empty bobbin placed on the spindle. The yarn must be pieced up and placed under the traveler of the spinning ring before the spindle is put back in operation. Stopping the spindle is customarily achieved by having individual braking means on each spindle. In the early forms, the brake stopped both the spindle and the driving pulley that was fixed to the lower end. The driving belt slipped on the pulley while the spindle was stopped. This, of course, was undesirable because of excessive wear on the pulley and the driving belt.

In due course, the concept of a clutch mechanism between the driving shaft and the spindle was introduced. The prior art shows electromagnetic means surrounding the spindle for causing disengagement of the clutch and engagement of the brake. As examples of the prior art, see the patents to Kooistra U.S. Pat. Nos. 3,410,380, 3,415,050 and Stiepel et al., U.S. Pat. No. 3,364,670.

Some of the prior art constructions show an electromagnet which upon being energized pulls toward it and engages an axially movable clutch disc, which clutch disc normally is spring pressed into engagement with a drive plate for operation of the spindle. Numerous shortcomings have been found when these devices have been placed in commercial use. A first difficulty has been noted in the inability to maintain the axes of the spindle and the driving shaft in accurate alignment while at the same time providing axial relative adjustment of the spindle and driving shaft. Such adjustment is essential to obtain the precise clearance necessary between the electromagnet and the clutch disc for effective operation of the brake.

A second defect in prior art devices has appeared in the flexible connection between the clutch disc and the lower end of the spindle.

A third unsatisfactory feature has been found in the operation of the electromagnet brake. When the electromagnet is sufficiently strong to lift the clutch disc upwardly away from the drive plate to initiate the braking of the spindle rotation, the braking force has been so great as to cause too rapid deceleration of the spindle. In the present invention, the deceleration rate has been diminished through a novel construction of the upper periphery of the clutch disc, which reduces the pressure of the clutch disc against the electromagnet without diminution of the initial pull. The resulting reduction in the rate of deceleration of the spindle throws less stress on the flexible unit that connects the spindle to the clutch disc which in turn gives longer life to the intermediate flexible element.

DESCRIPTION OF THE PREFERRED EMBODIMENT

Figure 1:
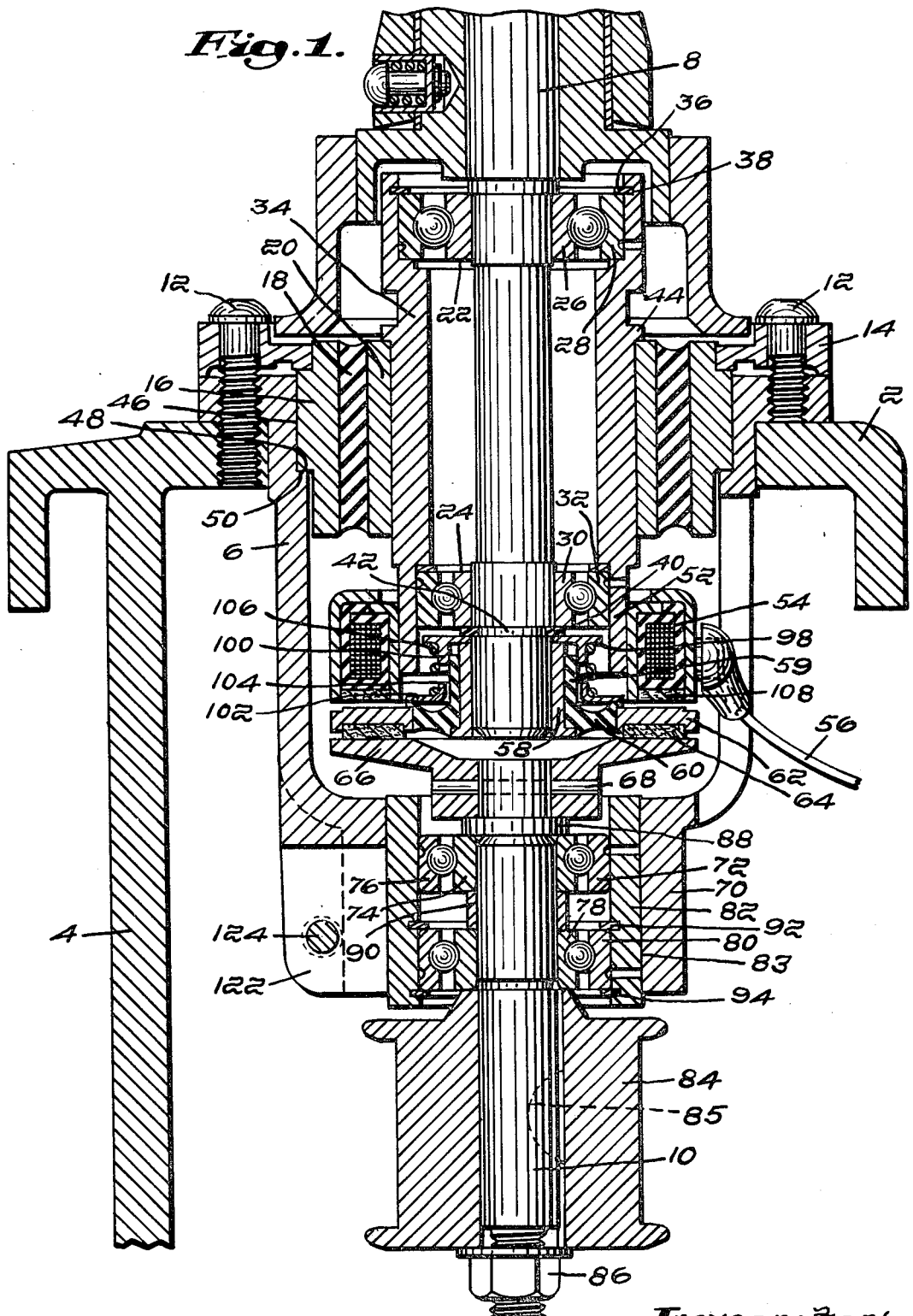
FIG. 1 is a vertical cross-section showing a portion of the spindle frame with a housing mounted thereon which housing carries in its upper part the spindle bearing and spindle, and in its lower part the driving shaft bearing and driving shaft. The clutch is shown in operative position.

Referring to the figures, a vertical cross-section of the spinning frame is shown at 2. The side of the frame at 4 is adjacent the operator. This frame carries a plurality of housings 6 and the related spindle 8 and driving shaft 10.

The housing 6 is secured to frame 2 by screws 12 by means of an intermediate plate 14 which also acts to hold a cylindrical sleeve 16 in position within the upper part of housing 6.

Within sleeve 16 is another sleeve 18 of elastomeric material, such as neoprene for example, and on the inside of sleeve 18 is mounted still another metallic sleeve 20.

The inner sleeve 20 in turn supports the spindle bearing structure which comprises an upper bearing 22 and a lower bearing 24 having inner and outer races 26 and 28 and 30 and 32, respectively. The upper outer race 28 rests on a shoulder in the upper end of a bearing carrying sleeve 34 where it is held by a ring 36 resting in a cylindrical groove 38. The lower bearing 24 is mounted within the lower end of sleeve 34 and held against downward movement by the ring 40 residing in a groove 42 in the spindle 8.

Sleeve 34 has a circular flange 44 which rests on the upper end of sleeve 20, and sleeve 16 fits closely within the cylindrical surface 46 with its shoulder 48 resting on shoulder 50 of the housing. It is thus apparent that the spindle bearing is established in fixed vertical relation to the housing 6. It will also be understood that the inner cylindrical surface 46 and the inner and outer surfaces of sleeves 16, 20 and 34 are all concentric with the axis of spindle 8.

Sleeve 34 has a lower extension 52 on which is mounted a cylindrical electromagnet 54 which may be energized by a suitable source of electrical power 56.

Affixed to the lower end of spindle 8 is sleeve 58. This sleeve supports a cylindrical unit 60 made of elastomeric material and which in general in cross section is L-shaped. The upwardly extending portion 59 of unit 60 provides a relatively large interior cylindrical surface enabling secure attachment to be made to sleeve 58.

The exterior periphery of unit 60 at the lower laterally extending portion has attached thereto a clutch disc in the form of an annular element 62 whose outer diameter is more or less equal to the outer diameter of electromagnet 54. The upper surface of clutch disc 62 is preferably flat and acts as a braking surface in conjunction with the lower face of the electromagnet unit which will be described shortly. The lower surface of clutch disc 62 includes an annular brake disc 64 which is adapted to cooperate frictionally with a drive plate 66.

Drive plate 66 is secured by pin 68 on the upper end of driving shaft 10. The driving shaft 10 is supported with respect to the lower end 70 of housing 6 by a bearing 72. This bearing comprises inner and outer races 74 and 76 and inner and outer races 78 and 80. The outer races are mounted within a cylindrical sleeve 82 which fits closely within a cylindrical interior surface 83 within the lower extension 70. On the lower end of driving shaft 10 is a belt driven whorl 84 held in position by a key 85 and a nut 86.

This upper inner race 74 engages a collar 88. A spacer 90 maintains the upper and lower bearings in proper spaced relation, and the rings 92 and 94 located in suitable grooves in sleeve 82 hold the outer race 80 of the lower bearing in correct position. The nut 86 forces whorl 84 upwardly to secure the inner races tightly in position on driving shaft 10.

Returning now to the mechanism at the lower end of spindle 8, there is a flange 98 fixed to spindle 8 between the upper end of sleeve 58 and the ring 40. Flange 98 has a short circular depending flange 100. Directly below is an annular element 102 which has an upwardly turned inner shoulder 104 which fits loosely about the cylindrical neck 59 of unit 60. The diameter of element 102 is great enough to overlie the interior periphery of the clutch disc 62 but is clear of engagement with the interior of the electromagnet 54. It will be noted that between the underside of annular element 102 and the upper interior periphery of clutch disc 62 is a short peripheral flange 105 which is preferably an integral part of the elastomeric unit 60.

Between flange 98 and annular element 102 is positioned a coil spring 106 which is in substantial compression.

The normal configuration of the circular elastomeric unit 60 is such that it will urge the clutch disc 62 downwardly against drive plate 66. This force is augmented by the compression spring 106 so that the total force of clutch disc 62 against drive plate 66 is adequate to enable driving shaft 10 to rotate spindle 8 without slippage under whatever load is normally applied to spindle 8 during the spinning operation.

When it is desired to stop rotation of spindle 8 for doffing or piecing up or otherwise, the electromagnet 54 is energized. Such energization may occur by manual operation of a switch, or it may occur automatically upon the breaking of the thread being spun.

When the electromagnet is energized, the flux is of sufficient strength to pull the ferrous clutch disc 62 upwardly across the smaller air gap normally present between the underside of the electromagnet structure and the upper surface of the clutch disc 62. This upward movement of clutch disc 62 occurs substantially instantaneously and brings the upper surface of the clutch disc into engagement with the annular brake disc 108 positioned in the bottom of the magnet housing.

Figure 2:
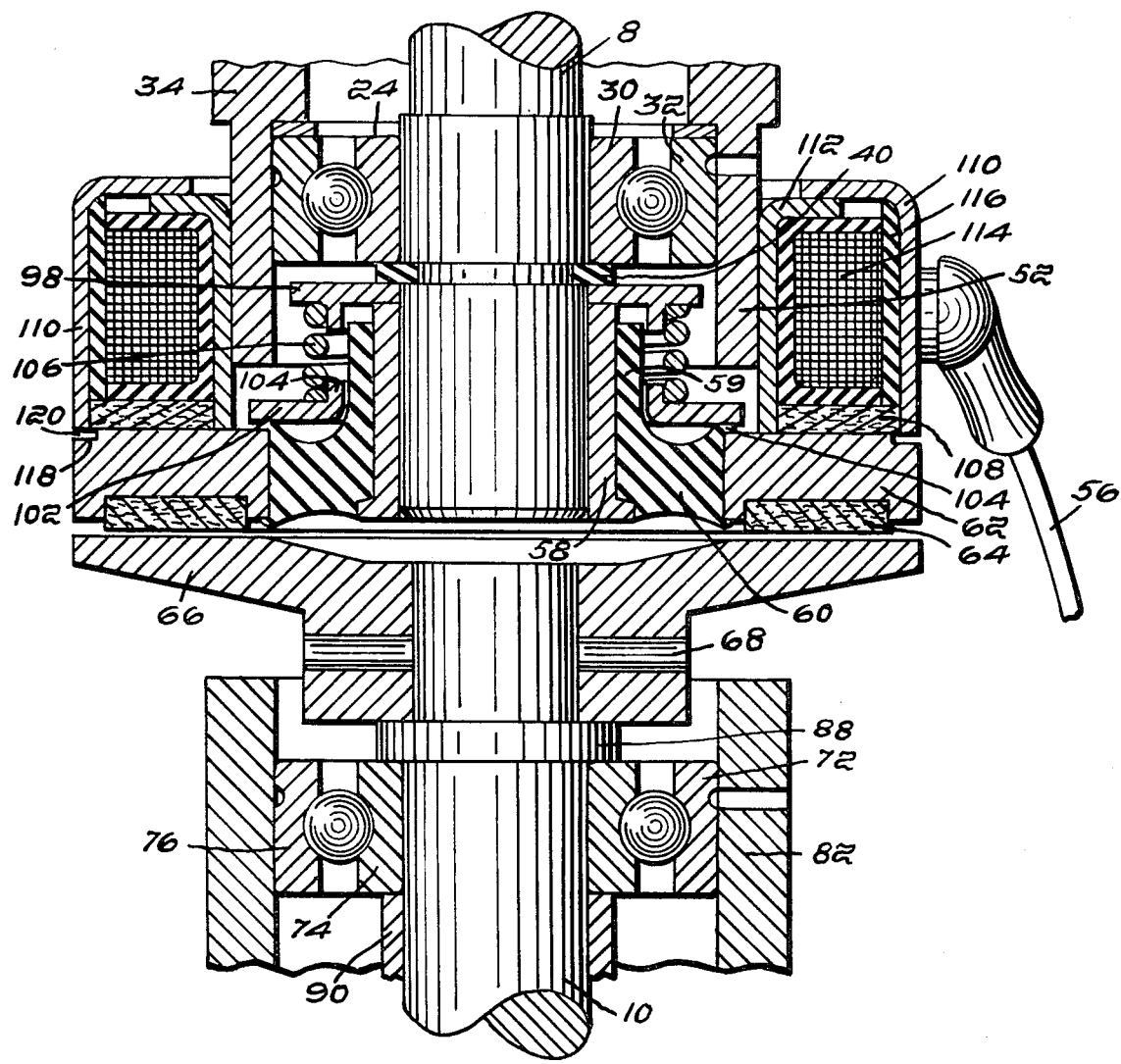
FIG. 2 is an enlarged view of the central portion of FIG. 1 showing the clutch disc in raised braking position.

On reference to FIG. 2, it will be noted that the magnet housing consists of a circular outer cover 110 and inner circular cover 112, which covers are in contact at the top where they overlap. The winding which ordinarily will be in the form of a copper coil 114 is covered by insulation 116. The air gap between the clutch disc 62 and the underside of the electromagnet will be a distance in the order of 0.008 and 0.010 inches. The flux is of sufficient strength to bridge this air gap and lift the ferrous clutch disc 62 against the resistance of the elastomeric unit 60 and spring 106 to bring the clutch disc 62 instantaneously against the brake disc 108.

It will now be noted that the upper periphery of clutch disc 62 has been cut away as at 118 to provide an air gap 120 between the outer wall 110 and the clutch disc 62. Thus, even though the clutch disc 62 has been instantly placed against brake disc 108, the pressing force between the parts is limited by virtue of the air gap. The result is that while the spindle 8 is quickly brought to a halt, nevertheless the rate of the deceleration is reduced considerably below what it would be if the air gap 120 were not present.

Since it is essential that the normal operating air gap between the upper surface of clutch disc 62 and the underside of the electromagnet 54 be very precise, means for axially adjusting the position of driving shaft 10 and drive plate 66 and clutch disc 62 must be provided.

It has been determined by prior practice that the use of screw threaded means of adjustment is not desirable because it is virtually impossible to provide a thread which when rotated will not change the angularity of the axis to a small degree. To avoid this difficulty, the sleeve 82 is slidably mounted within the interior cylindrical surface 84 which surface is precisely concentric with the interior cylindrical surface 46. The lower end of the housing extension 70 is split at one side as at 122 and when the bolt 124 is tightened, extension 70 is contracted to grip sleeve 82 and hold it securely in its adjusted position.

To make proper adjustment, a feeler may be placed between the upper side of clutch disc 62 and the bottom of the electromagnet 54. The whorl and associated drive shaft and drive plate 66 and clutch disc 62 with bolt 124 loosened is then pushed upwardly compressing the coil spring and deflecting the cylindrical elastomeric unit. When the feeler is engaged top and bottom, then the bolt 124 is tightened to secure the sleeve 82 and the driving shaft 10 and related elements are in proper axial position for operation.

The construction disclosed provides means whereby the axes of the spindle and driving shaft are maintained in exact alignment, the clutch disc may be adjusted without the use of screw threads, and the spindle may be driven by the drive shaft or braked by operation of the electromagnet at a reduced rate of deceleration.

It is intended to cover all changes and modifications of the example of the invention herein chosen for purposes of the disclosure which do not constitute departures from the spirit and scope of the invention.

I claim:

1. A spindle assembly for use in a spinning frame comprising a supporting housing with aligned spindle and driving shaft mounted therein, a clutch between said spindle and driving shaft, said clutch comprising a drive plate on the end of said driving shaft adjacent said spindle, a clutch disc on the end of said spindle adjacent said drive plate, said clutch disc comprising an annulus of ferrous material connected to said spindle by an annular unit of elastomeric material, the interior of said unit secured to said spindle and the exterior of said unit secured to the said clutch disc, whereby said disc is capable of limited axial movement with respect to said spindle and said clutch disc will be pressed by said elastomeric unit against said drive plate, electromagnetic means for periodically moving said clutch disc out of engagement with said drive plate, said electromagnetic means comprising a stationary cylindrical electromagnet enclosed in a cylindrical metallic cover with inner and outer walls, said cover having an outer diameter substantially equal to the diameter of said clutch disc, said electromagnet surrounding the end of said spindle and being closely adjacent one face of said clutch disc, said clutch disc being cut away at its upper outer circumference to produce an air gap below the bottom of the outer wall of said metallic cover, said air gap being of such size to cause a substantial lessening of the braking effect of the clutch disc against said electromagnet whereby the rate of deceleration of rotation of said spindle is decreased substantially as compared with the deceleration rate in the absence of said air gap.

2. A spindle assembly for use in a spinning frame comprising a supporting housing with aligned spindle and driving shaft mounted therein, a clutch between said spindle and driving shaft, said clutch comprising a drive plate on the end of said driving shaft adjacent said spindle, a clutch disc on the end of said spindle adjacent said drive plate, said clutch disc comprising an annulus of ferrous material connected to said spindle by an annular unit of elastomeric material, the interior of said unit secured to said spindle and the exterior of said unit secured to the said clutch disc, whereby said disc is capable of limited axial movement with respect to said spindle and said clutch disc will be pressed by said elastomeric unit against said drive plate, electromagnetic means for periodically moving said clutch disc out of engagement with said drive plate, said spindle and driving shaft being mounted in bearings supported by said housing, said housing and bearing supporting structure being constructed as follows: said housing having a first continuous cylindrical surface and a second split cylindrical surface both concentric with the spindle and driving shaft axes, there being within the first cylindrical housing surface first, second and third sleeves having concentric cylindrical surfaces, said first and second sleeves separated by a cylinder of insulating material, said third sleeve carrying bearings within which said spindle may turn on its axis which coincides with the axis of said cylindrical surfaces, said first, second and third sleeves and spindle fixed axially with respect to each other and to said housing, said housing being split longitudinally at the said second split cylindrical surface, another sleeve carrying bearings within which said driving shaft is mounted for rotation, said last named sleeve positioned within said second split cylindrical housing surface, said split housing providing releasable clamping means permitting adjustment of the axial position of said last named sleeve and driving shaft with respect to said spindle without misalignment of their axes.

3. The construction set forth in claim 1 and means for augmenting the frictional force between said drive plate and clutch disc, said means comprising a circular flange mounted on said spindle above said elastomeric unit, an annular element surrounding said spindle and located for axial movement on said spindle between said flange and clutch disc; said annular element having parts overlying said clutch disc, and a spring located between said flange and said annular element urging the latter downwardly against said clutch disc.

4. The construction set forth in claim 2, and means for augmenting the frictional force between said drive plate and clutch disc, said means comprising a circular flange mounted on said spindle above said elastomeric unit, an annular element surrounding said spindle and located for axial movement on said spindle between said flange and clutch disc; said annular element having parts overlying said clutch disc, and a spring located between said flange and said annular element urging the latter downwardly against said clutch disc.

* * * * *